United States Patent
Yamauchi et al.

(10) Patent No.: US 11,002,256 B2
(45) Date of Patent: May 11, 2021

(54) MOVABLE DEVICE

(71) Applicant: DENSO CORPORATION, Kariya (JP)

(72) Inventors: Takuma Yamauchi, Kariya (JP); Seiichiro Washino, Kariya (JP); Eitaro Tanaka, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 0 days.

(21) Appl. No.: 16/575,097

(22) Filed: Sep. 18, 2019

(65) Prior Publication Data

US 2020/0011305 A1 Jan. 9, 2020

Related U.S. Application Data

(63) Continuation of application No. PCT/JP2018/008672, filed on Mar. 7, 2018.

(30) Foreign Application Priority Data

Mar. 23, 2017 (JP) .............................. JP2017-057941

(51) Int. Cl.
*F03G 7/06* (2006.01)
*H02N 11/00* (2006.01)

(52) U.S. Cl.
CPC .............. *F03G 7/06* (2013.01); *H02N 11/00* (2013.01)

(58) Field of Classification Search
CPC ................................... F03G 7/06; H02N 11/00
See application file for complete search history.

(56) References Cited

U.S. PATENT DOCUMENTS

| | | | | |
|---|---|---|---|---|
| 3,665,705 A * | 5/1972 | Christensen | .............. | F03G 7/06 60/527 |
| 4,175,390 A * | 11/1979 | Koslow | .................... | F03G 7/06 60/527 |
| 4,553,394 A * | 11/1985 | Weinert | .................... | F03G 7/06 60/528 |
| 4,887,430 A * | 12/1989 | Kroll | ...................... | F03G 7/065 60/527 |
| 5,127,228 A * | 7/1992 | Swenson | ................. | F03G 7/065 60/527 |
| 6,065,934 A * | 5/2000 | Jacot | ....................... | F03G 7/065 244/99.8 |
| 6,129,181 A * | 10/2000 | Weems | ................... | F03G 7/065 185/37 |

(Continued)

FOREIGN PATENT DOCUMENTS

| | | |
|---|---|---|
| JP | 2003111458 A | 4/2003 |
| JP | 2016042783 A | 3/2016 |

(Continued)

*Primary Examiner* — Jesse S Bogue
(74) *Attorney, Agent, or Firm* — Harness, Dickey & Pierce, P.L.C.

(57) ABSTRACT

A movable device includes an actuator element that deforms about an actuator axis in response to increase or decrease in energy of the actuator element. A driven body is coupled to the actuator element on the actuator axis and turned by deformation of the actuator element. A guide mechanism guides turning of the driven body about a turning axis coaxial with the actuator axis such that torsional deformation of the actuator element is directly transferred to the turning of the driven body.

8 Claims, 5 Drawing Sheets

(56) References Cited

U.S. PATENT DOCUMENTS

| | | | |
|---|---|---|---|
| 7,082,890 B2 * | 8/2006 | MacGregor | F03G 7/065 116/284 |
| 2003/0079472 A1 | 5/2003 | Hara et al. | |
| 2004/0252005 A1 * | 12/2004 | Villhard | H01H 61/0107 337/393 |
| 2007/0016063 A1 * | 1/2007 | Park | A61B 8/4461 600/459 |
| 2008/0120977 A1 * | 5/2008 | Safran | F03G 7/06 60/531 |
| 2009/0249903 A1 * | 10/2009 | Godler | F16H 19/0654 74/89.2 |
| 2015/0152852 A1 | 6/2015 | Li et al. | |
| 2015/0219078 A1 | 8/2015 | Li et al. | |
| 2017/0035550 A1 * | 2/2017 | Hiraoka | A61F 7/00 |
| 2017/0314539 A1 | 11/2017 | Kim et al. | |
| 2018/0073490 A1 | 3/2018 | Li et al. | |
| 2019/0154122 A1 * | 5/2019 | Lima | F03G 7/06 |

FOREIGN PATENT DOCUMENTS

| | | |
|---|---|---|
| JP | 2018046592 A | 3/2018 |
| WO | WO-2016064220 A1 | 4/2016 |
| WO | WO-2017022146 A1 | 2/2017 |
| WO | WO-2018173743 A1 | 9/2018 |
| WO | WO-2018173744 A1 | 9/2018 |
| WO | WO-2018173745 A1 | 9/2018 |
| WO | WO-2018173746 A1 | 9/2018 |

* cited by examiner

MOVABLE DEVICE

CROSS REFERENCE TO RELATED APPLICATIONS

The present application is a continuation application of International Patent Application No. PCT/JP2018/008672 filed on Mar. 7, 2018, which designated the U.S. and claims the benefit of priority from Japanese Patent Application No. 2017-057941 filed on Mar. 23, 2017. The entire disclosures of all of the above applications are incorporated herein by reference.

TECHNICAL FIELD

A disclosure provided herein relates to a movable device that uses deformation of an actuator element.

BACKGROUND

A movable device uses deformation of an actuator element. The technique directly or indirectly uses deformation of an element to mechanically move a driven body. An example of such actuator element is elongated synthetic fiber.

SUMMARY

According to at least one embodiment of the present disclosure, a movable device includes an actuator element that deforms about an actuator axis in response to increase or decrease in energy of the actuator element, a driven body coupled to the actuator element on the actuator axis and turned by deformation of the actuator element, and a guide mechanism that guides turning of the driven body around a turning axis coaxial with the actuator axis such that torsional deformation of the actuator element is directly transferred to the turning of the driven body.

DETAILED DESCRIPTION

A movable device uses deformation of an actuator element. The technique directly or indirectly uses deformation of an element to mechanically move a driven body. An example of such actuator element is elongated synthetic fiber.

The configuration of the technique renders the operation of the driven body unstable. Affected by external vibration, the driven body may exhibit vibrational behavior. From the viewpoint described above or from other unmentioned viewpoints, there is demand for further improvement to the movable device.

The disclosure can provide a movable device that stabilizes behavior of a driven body.

The disclosure can provide a movable device capable of efficiently transmitting torsional deformation of an actuator element to turning motion of a driven body.

According to an aspect of the present disclosure, a movable device includes an actuator element that deforms about an actuator axis in response to increase or decrease in energy of the actuator element, a driven body coupled to the actuator element on the actuator axis and turned by deformation of the actuator element, and a guide mechanism that guides turning of the driven body around a turning axis coaxial with the actuator axis such that torsional deformation of the actuator element is directly transferred to the turning of the driven body.

The movable device disclosed herein can stably turn the driven body. The turning axis is coaxial with the actuator axis. Thus, deformation of the actuator element about the actuator axis is directly transmitted to the motion of the driven body in a turning direction. Moreover, the driven body is guided about the turning axis. Thus, turning of the driven body is stabilized.

Embodiments are described below with reference to the drawings. In some embodiments, elements functionally and/or structurally corresponding to one another and/or elements associated with one another may be designated with an identical symbol or symbols different in the hundreds place or greater. For a corresponding and/or associated element, description in another embodiment can be referenced.

Figure 1:
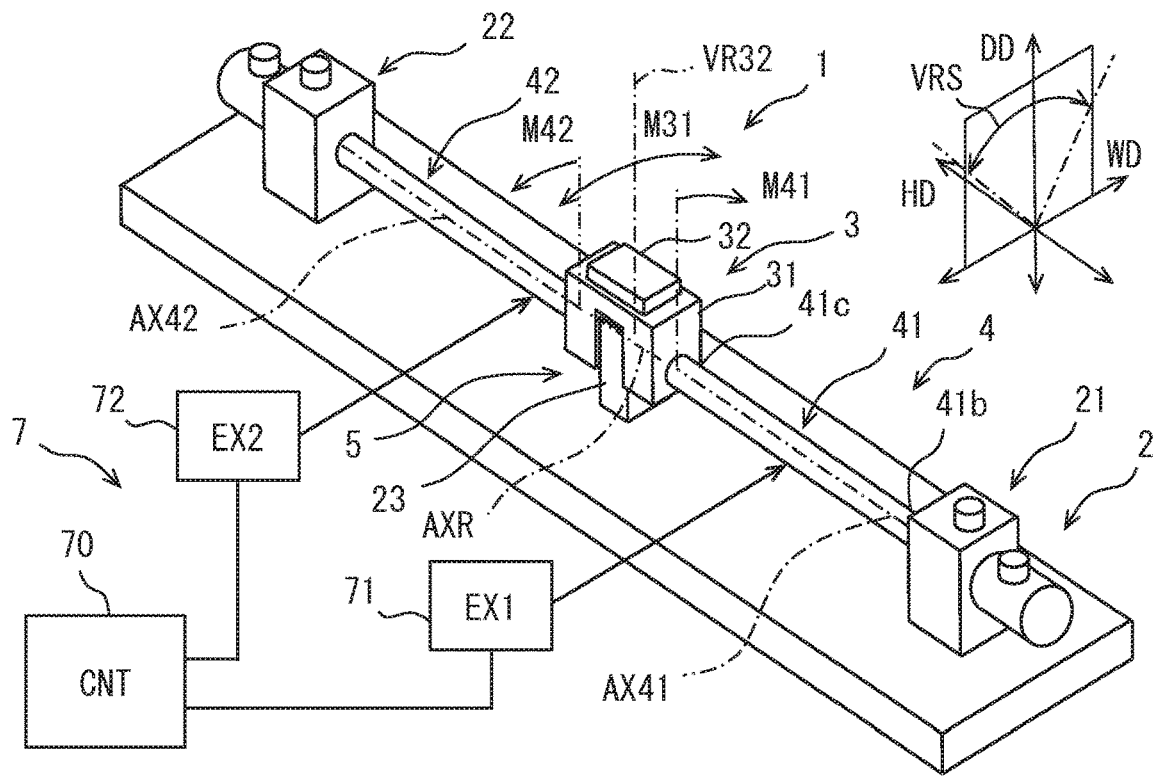
FIG. 1 is a perspective view of a movable device according to at least one embodiment.

In FIG. 1, a movable device 1 includes a base 2 that is stationary and a movable portion 3 mechanically movable relative to the base 2. The movable portion 3 is rotatable about a turning axis AXR extending along a height direction HD. The movable portion 3 moves back and forth in a predefined angle range RG about the turning axis AXR. The movable portion 3 includes a driven body 31. The motion of the movable portion 3 may be also referred to as swing. The moving direction of the movable portion 3 is not limited to turning. The movable portion 3 can be adapted to move in various directions, such as, translation along the height direction HD, translation along a width direction WD, and rotation about a depth direction DD.

The movable device 1 includes an element 32 mounted on the driven body 31. The element 32 produces electrical active action or electrical passive action. The element 32 is, for example, an electrical light source, an electrical blower, an electrical heat source, an electrical radio wave source, or an electrical magnetism source. The element 32 is, for example, an electrical sensor element. The movable device 1 may include a connecting material for electrically connecting the base 2 to the element 32. The element 32 has an axis VR32 for main functions. When, for example, the element 32 is a light source, the axis VR32 corresponds to an optical axis. When, for example, the element 32 is a sensor, the axis VR32 corresponds to a detection axis. The axis VR32 swings when the driven body 31 is turned. The axis VR32 swings in the range of a turning angle VRS.

The movable device 1 is also a sensor unit. The element 32 is a sensor element. The element 32 has the axis VR32 that indicates a detection direction and a detection range. The element 32 detects a physical quantity in the direction of the axis VR32. Various types of elements such as, an image sensor, an infrared sensor, an ultrasonic sensor, a radar antenna, an electromagnetic sensor, or a radiation sensor can serve as the element 32. In the present embodiment, the element 32 is an infrared sensor for installation in a room. A detection signal from the element 32 is supplied through wired or wireless communication to a device that uses infrared information. The infrared information is, for example, supplied to an air conditioner for use therein. The movable device 1 is installed in a room or compartment in a house, an office, a vehicle, a ship, an aircraft, and the like and used to collect information related to people therein. The base 2 is secured in the room or compartment.

The movable device 1 swings and moves the axis VR32. The movable device 1 serves as a sensor unit that moves the axis VR32. Since the axis VR32 moves, the movable device 1 can serve as different types of sensor unit such as an orientation-variable-type, tracking-type, or scanning-type sensor unit. The present embodiment, in which the driven body 31 swings periodically, provides a scanning-type sensor unit. The axis VR32 is turned about the turning axis AXR. The axis VR32 can move along a plane extending in the width direction WD and the depth direction DD within a predefined range of the turning angle VRS. In the present embodiment, the turning angle VRS corresponds to a scanning range.

The movable device 1 includes an actuator mechanism 4. The actuator mechanism 4 provides a rotating force for turning the movable portion 3. The actuator mechanism 4 is also a power source. The actuator mechanism 4 provides a reciprocating rotating force.

The actuator mechanism 4 includes two actuator elements 41 and 42. The two actuator elements 41 and 42 are disposed on an extension of the turning axis AXR. The two actuator elements 41 and 42 are disposed on both sides of the driven body 31. The driven body 31 and the two actuator elements 41 and 42 are disposed in series. In the drawings, the actuator elements 41 and 42 are emphasized with slightly thicker lines.

The first actuator element 41 is coupled to the driven body 31 and a securing portion 21. The first actuator element 41 extends along an actuator axis AX41. The actuator axis AX41 is also the central axis of the first actuator element 41. The actuator axis AX41 is located on an extension of the turning axis AXR. The actuator axis AX41 and the turning axis AXR are coaxial.

The second actuator element 42 is coupled to the driven body 31 and a securing portion 22. The second actuator element 42 extends along an actuator axis AX42. The actuator axis AX42 is also the central axis of the second actuator element 42. The actuator axis AX42 is located on an extension of the turning axis AXR. The actuator axis AX42 and the turning axis AXR are coaxial.

The driven body 31 is disposed in a middle portion of the base 2. The securing portion 21 is disposed in one end portion of the base 2. The securing portion 21 is secured to the base 2. The securing portion 22 is disposed in the other end portion of the base 2. The securing portion 22 is secured to the base 2. The base 2 is made using a material that can maintain the shape of the movable device 1 against the force generated by the actuator mechanism 4. For example, the base 2 is made using metal or resin. The base 2 may be made using a printed wiring board in part or in entirety.

The first actuator element 41 and the second actuator element 42 are disposed symmetrically with respect to the driven body 31. The first actuator element 41 and the second actuator element 42 have symmetrical structures. The first actuator element 41 is described below. The description below can be referenced for the second actuator element 42.

The first actuator element 41 has a securing end 41*b* that can be coupled to the securing portion 21. The securing end 41*b* is coupled to the securing portion 21, at least when the first actuator element 41 outputs a turning force. The first actuator element 41 has an output end 41*c* that can be coupled to the driven body 31. The output end 41*c* is coupled to the driven body 31, at least when the first actuator element 41 outputs a turning force. The driven body 31 is coupled to the actuator element 41 on the actuator axis AX41. Note that the securing end 41*b* and the output end 41*c* are named for convenience. The securing end 41*b* and the output end 41*c* may be referred to simply as the end portions in the description below.

The first actuator element 41 has a rod shape. The first actuator element 41 has a shape that can be described as elongated rod-like or fibrous. The first actuator element 41 can have a cylindrical shape or a tubular shape.

The movable device 1 includes a guide mechanism 5 for guiding the motion of the movable portion 3. The guide mechanism 5 is disposed between a support 23 provided on the base 2 and the driven body 31. The support 23 is secured to the base 2. The guide mechanism 5 allows rotational motion of the driven body 31 about the height direction HD. The guide mechanism 5 inhibits rotational motion about the depth direction DD and rotational motion about the width direction WD. Of movement of the driven body 31, the guide mechanism 5 inhibits an up-and-down motion in the depth direction DD and a left-and-right motion in the width direction WD. The guide mechanism 5 may inhibit back-and-forth motion in the height direction HD. The guide mechanism 5 may allow back-and-forth motion in the height direction HD.

The height direction HD can be defined as a roll axis, the width direction WD as a pitching axis, and the depth direction DD as a yaw axis. In this definition, the guide mechanism 5 allows roll motion of the driven body 31. The guide mechanism 5 may inhibit excessive roll motion that exceeds an available range. For example, direct collision between the driven body 31 and the support 23 or indirect collision therebetween via an elastic component restricts a roll motion range. The guide mechanism 5 inhibits yawing motion and pitching motion of the driven body 31. The guide mechanism 5 also inhibits up-and-down motion and left-and-right motion of the driven body 31. The guide mechanism 5 may inhibit back-and-forth motion of the driven body 31. The guide mechanism 5 may allow back-and-forth motion of the driven body 31.

The movable device 1 includes a control system 7. The control system 7 includes a controller (CNT) 70 and energy increasing/decreasing devices (EX1 and EX2) 71 and 72. The energy increasing/decreasing devices 71 and 72 increase or decrease energy of the two actuator elements 41 and 42 for extracting mechanical motion from the actuator elements 41 and 42, respectively. The energy increasing/decreasing devices 71 and 72 increase or decrease energy of the two actuator elements 41 and 42 to rotate the two actuator elements 41 and 42, respectively.

The controller includes at least one processor controller (CPU) and at least one memory device as a storage medium for storing a program and data. A microcomputer that includes a computer-readable storage medium serves as the controller. The storage medium is a non-transitional substantive storage medium that stores a computer-readable program in a non-temporary fashion. A semiconductor memory, a magnetic disk, or the like can serve as the storage medium. A computer or a set of computer resources linked together by a data communication device can serve as the controller. When executed by the controller, the program causes the controller to function according to the description provided herein and causes the controller to perform the methods described herein.

The control system includes, as input devices, a plurality of signal sources that supply signals indicative of information to be input to the controller. The control system acquires information when the controller stores the information in the memory device. The control system includes, as output devices, a plurality of control targets the behaviors of which are controlled by the controller. The control system controls the behaviors of the control targets by converting the information stored in the memory device to signals and supplying the signals to the control targets. For example, the controller acquires an operation signal and a stop signal externally and activates the energy increasing/decreasing devices 71 and 72 intermittently to thereby cause the movable device 1 to move in a swinging manner.

The controller, the signal sources, and the control targets included in the control system serve as various elements. At least part of such elements can be referred to as a block for performing a function. In another aspect, at least part of such elements can be referred to as a module construed as a configuration or a section. Furthermore, such elements included in the control system can be referred to as means for performing the functions thereof only when the functions are intended to be performed.

Means and/or functions provided by the control system can be provided by software recorded in a substantive memory device and a computer that can execute the software, software only, hardware only, or some combination of them. For example, when an electronic circuit, which is hardware, serves as the controller, the electronic circuit can be a digital circuit that includes many logical circuits, or an analog circuit.

Each of the two actuator elements 41 and 42 produces active deformation in one direction. The two actuator elements 41 and 42 deform in opposite directions, i.e., in symmetrical directions. Active deformation that is bidirectional, i.e., reciprocating can be obtained by using the two actuator elements 41 and 42.

The actuator elements 41 and 42 deform about the actuator axes AX41 and AX42, respectively, in response to increase or decrease of thermal energy. The first actuator element 41 deforms to be twisted when the temperature of the first actuator element 41 increases. With the securing end 41b secured to the securing portion 21, the driven body 31 is turned toward a direction indicated by an arrow M41, which is a first direction. The second actuator element 42 deforms to be twisted when the temperature of the second actuator element 42 increases. With a securing end 42b secured to the securing portion 22, the driven body 31 is turned toward a direction indicated by an arrow M42, which is a second direction. The direction of the arrow M41 and the direction of the arrow M42 are symmetrical with respect to the driven body 31. The driven body 31 is thus turned over an angular range indicated by an arrow M31. The arrow M31 corresponds to the turning angle VRS of the axis VR32.

The actuator elements 41 and 42 and the energy increasing/decreasing devices 71 and 72 usable in the present embodiment include those described in US 2015/0219078 A1. The disclosure of US 2015/0219078 A1 is incorporated herein by reference to explain technical elements presented herein. The actuator elements 41 and 42 can be provided by using various materials referred to as artificial muscles. For example, materials such as synthetic resin, metal, shape-memory alloy, and organic matter can be used.

One example of the actuator elements 41 and 42 is synthetic fiber. Synthetic fiber extends along an extension of the turning axis AXR. The synthetic fiber is elongated. The synthetic fiber is referred to as polymer fiber. One typical example of polymer fiber is monofilament resin. Monofilament resin includes polyamide resin and polyethylene resin. For example, polymer fiber referred to as nylon or polyethylene may have an amount of torsional deformation in response to a temperature change, and such materials can be used as the actuator elements 41 and 42.

Macromolecules forming the polymer fiber are oriented to extend along the actuator axes AX41 and AX42. The macromolecules may have twist about the actuator axes AX41 and AX42. The term "twist" may refer to twist in a monofilament or twist in fibers. The amount of torsional deformation of the polymer fiber in response to a temperature change may be dominant along the direction of the "twist" in a monofilament. In the present embodiment, the actuator elements 41 and 42 are monofilaments. In another embodiment, the amount of torsional deformation of the polymer fiber in response to a temperature change may be present along the direction of the "twist" in a plurality of fibers. The actuator elements 41 and 42 may be bundles of twisted polymer fibers.

One example of the actuator elements 41 and 42 is a shape-memory alloy. Shape-memory alloys that extend along the actuator axes AX41 and AX42 can be used. A shape-memory alloy in various shapes such as a single rod and a coiled shape can be used. The shape of the shape-memory alloy is selected to obtain an amount of torsional deformation in response to a temperature change.

The energy increasing/decreasing devices 71 and 72 change the energy states of the actuator elements 41 and 42, respectively, between a high energy state and a low energy state bidirectionally. The energy increasing/decreasing devices 71 and 72 can provide and remove energy electrically, optically, magnetically, electromagnetically, or radiationally. Providing and removing electrical energy includes increasing and decreasing of electrical heat, of electric current, of an electric field, or of electric charge. For example, if the energy states of the actuator elements 41 and 42 are indicated by temperature, light can be provided to raise the temperature and light can be interrupted to lower the temperature.

The energy can be provided and removed directly or indirectly. For example, energy may be provided to the actuator elements 41 and 42 by using energy transfer elements that are in direct contact with the actuator elements 41 and 42. Alternatively, energy may be provided to the actuator elements 41 and 42 indirectly by using energy transfer elements that are placed away from the actuator elements 41 and 42. For example, an electrical heat generator can serve as the energy transfer element.

To cause the actuator elements 41 and 42 to actively rotate, the energy increasing/decreasing devices 71 and 72 increase the thermal energy of the actuator elements 41 and 42, for example. The thermal energy can be increased by, for example, supplying electric current to the heat generators respectively provided for the actuator elements 41 and 42. To cause the actuator elements 41 and 42 to return from the active rotation, the energy increasing/decreasing devices 71 and 72 decrease the thermal energy of the actuator elements 41 and 42, for example. The thermal energy can be decreased by, for example, interrupting electric current to the heat generators respectively provided for the actuator elements 41 and 42, thereby allowing the actuator elements 41 and 42 to release heat.

Figure 2:
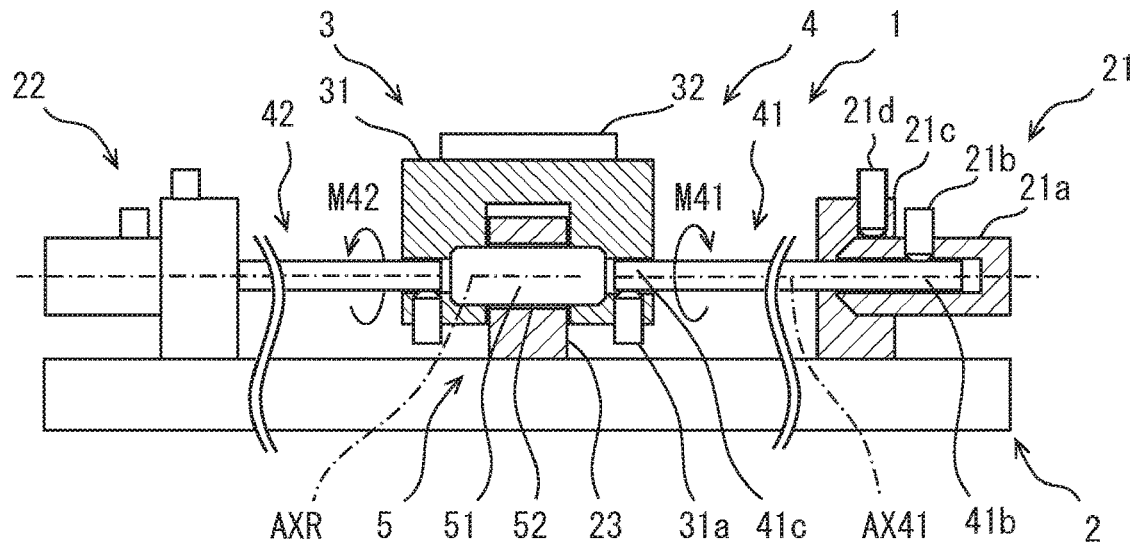
FIG. 2 is a partial sectional view of the movable device.

In FIG. 2, the securing portion 21 and the securing portion 22 are disposed symmetrically with respect to the driven body 31. The securing portion 21 and the securing portion 22 have symmetrical structures. The driven body 31 has a symmetrical structure with respect to the guide mechanism 5. Elements related to the first actuator element 41 are described below. The description below can be referenced for elements related to the second actuator element 42. Elements related to the first actuator element 41 include the securing portion 21 and a third coupling mechanism 31c included in the driven body 31.

The securing portion 21 includes an end sleeve 21a and an anchor block 21c. The end sleeve 21a is coupled to an end portion of the actuator element 41. The end sleeve 21a is secured to the anchor block 21c. The anchor block 21c is secured to the base 2.

The end sleeve 21a has a tubular shape and is coaxial with the actuator element 41. The end sleeve 21a may have a polygonal tubular shape. The end sleeve 21a has an inner hole for receiving the securing end 41b of the actuator element 41. The end sleeve 21a includes a first coupling mechanism 21b for coupling the securing end 41b and the end sleeve 21a together. The first coupling mechanism 21b couples the securing end 41b and the end sleeve 21a together in a circumferential direction of the actuator axis AX41, at least when the actuator element 41 outputs a turning force.

An inner hole and a set screw serve as the first coupling mechanism 21b. The set screw is disposed toward the inner hole of the end sleeve 21a in a radial direction. The set screw tightens the securing end 41b in a radial direction of the securing end 41b to thereby couple the securing end 41b and the end sleeve 21a together in an axial direction and a circumferential direction of the securing end 41b.

Various mechanisms can serve as the first coupling mechanism 21b. For example, the first coupling mechanism 21b can be a plurality of set screws placed radially, a chuck mechanism that tightens the securing end 41b in the radial direction of the securing end 41b, a crimp sleeve that tightens the securing end 41b in the radial direction of the securing end 41b, or the like. The first coupling mechanism 21b may allow the securing end 41b to move relative to the end sleeve 21a in the axial direction of the securing end 41b along the actuator axis AX41. For example, the securing end 41b and the end sleeve 21a may be coupled together such that the securing end 41b can move in the axial direction within a limited range. For example, an elastic component, such as a spring or rubber, can be used for the first coupling mechanism 21b. An openable/closable mechanism can serve as the first coupling mechanism 21b. For example, the first coupling mechanism 21b can be an electromagnetic mechanism capable of switching between a state in which the securing end 41b is secured in the circumferential direction thereof and a state in which the securing end 41b is turnable in the circumferential direction thereof.

The anchor block 21c has an inner hole for receiving the end sleeve 21a. The anchor block 21c includes a second coupling mechanism 21d for coupling the end sleeve 21a and the anchor block 21c together. The second coupling mechanism 21d couples the end sleeve 21a and the anchor block 21c together in the circumferential direction of the actuator axis AX41, at least when the actuator element 41 outputs a turning force.

An inner hole and a set screw serve as the second coupling mechanism 21d. The set screw is disposed in a radial direction of the inner hole of the anchor block 21c toward the inner hole of the anchor block 21c. The set screw tightens the end sleeve 21a in a radial direction of the end sleeve 21a to thereby couple the end sleeve 21a and the anchor block 21c together in an axial direction and a circumferential direction of the end sleeve 21a.

Various mechanisms can serve as the second coupling mechanism 21d. For example, the second coupling mechanism 21d can be a plurality of set screws placed radially, a chuck mechanism that tightens the end sleeve 21a in the radial direction of the end sleeve 21a, a crimp sleeve that tightens the end sleeve 21a in the radial direction of the end sleeve 21a, or the like. The second coupling mechanism 21d may allow the end sleeve 21a to move in the axial direction of the end sleeve 21a along the actuator axis AX41. For example, the anchor block 21c and the end sleeve 21a may be coupled together such that the end sleeve 21a can move in the axial direction within a limited range. For example, an elastic component, such as a spring or rubber, can be used for the first coupling mechanism 21b. An openable/closable mechanism can serve as the second coupling mechanism 21d. For example, the second coupling mechanism 21d can be an electromagnetic mechanism capable of switching between a state in which the end portion of the actuator element 41 is secured in the circumferential direction thereof and a state in which the end portion of the actuator element 41 is turnable in the circumferential direction thereof.

The driven body 31 has an inner hole for receiving the output end 41c of the actuator element 41. The driven body 31 includes the third coupling mechanism 31a for coupling the driven body 31 and the output end 41c together. The third coupling mechanism 31a couples the output end 41c and the driven body 31 together in the circumferential direction of the actuator axis AX41, at least when the actuator element 41 outputs a turning force.

An inner hole and a set screw serve as the third coupling mechanism 31a. The set screw is disposed in a radial direction of the inner hole of the driven body 31 toward the inner hole of the driven body 31. The set screw tightens the output end 41c in a radial direction of the output end 41c to thereby couple the driven body 31 and the output end 41c together in an axial direction and a circumferential direction of the output end 41c.

Various mechanisms can serve as the third coupling mechanism 31a. For example, the third coupling mechanism 31a can be a plurality of set screws placed radially, a chuck mechanism that tightens the output end 41c in the radial direction of the output end 41c, a crimp sleeve that tightens the output end 41c in the radial direction of the output end 41c, or the like. The third coupling mechanism 31a may allow the output end 41c to move relative to the driven body 31 in the axial direction of the output end 41c along the actuator axis AX41. For example, the output end 41c and the driven body 31 may be coupled together such that the output end 41c can move in the axial direction within a limited range. For example, an elastic component, such as a spring or rubber, can be used for the first coupling mechanism 21b. An openable/closable mechanism can serve as the third coupling mechanism 31a. For example, the third coupling mechanism 31a can be an electromagnetic mechanism capable of switching between a state in which the output end 41c is secured in the circumferential direction thereof and a state in which the output end 41c is turnable in the circumferential direction thereof. The driven body 31 is turnably supported by the guide mechanism 5. The guide mechanism 5 includes a shaft 51 and a guide bore 52. A tubular element that is coaxial with the turning axis AXR serves as the shaft 51. The shaft 51 is secured to the driven body 31. The shaft 51 is secured at both ends to the driven body 31. The driven body 31 includes the shaft 51. The guide bore 52 is disposed in the support 23. The support 23 includes the guide bore 52. The support 23 supports the driven body 31. The support 23 is secured to the base 2. The support 23 is a block. A through hole that passes through the support 23 serves as the guide bore 52. The guide bore 52 receives the shaft 51. The guide bore 52 allows the shaft 51 to rotate. As a result, the support 23 rotatably supports the driven body 31. An outer surface of the shaft 51 is partially in contact with an inner surface of the guide bore 52. When the driven body 31 is turned, the outer surface of the shaft 51 and the inner surface of the guide bore 52 slide on each other. The driven body 31 is guided about the shaft 51. A material that forms the shaft 51 and the guide bore 52 has low friction property. A material that forms the shaft 51 or the guide bore 52 may have low friction property. Using such a material reduces friction between the shaft 51 and the guide bore 52.

The support 23 has two end surfaces that face the driven body 31. The two end surfaces of the support 23 are partially in contact with portions of the driven body 31. When the driven body 31 is turned, the support 23 and the driven body 31 slide on each other.

Heat of the actuator element 41 is dissipated from the entire actuator element 41 to an outside environment. Heat of the actuator element 41 is dissipated from the securing end 41b through the securing portion 21. In this case, the first coupling mechanism 21b and the second coupling mechanism 21d contribute to reduction of thermal resistance in a heat dissipating path. Heat of the actuator element 41 is also dissipated from the output end 41c through the driven body 31. Heat of the actuator element 41 may be dissipated from the output end 41c through the driven body 31, the support 23, and the base 2. In this case, the third coupling mechanism 31a contributes to reduction of thermal resistance in a heat dissipating path.

Contact between the driven body 31 and the support 23 and/or contact between the shaft 51 and the guide bore 52 also contribute to reduction of thermal resistance in a heat dissipating path. Heat of the actuator element 41 is dissipated from the output end 41c through the driven body 31, the contact between the driven body 31 and the support 23, and the support 23. Heat of the actuator element 41 is also dissipated from the output end 41c via the driven body 31 through the shaft 51, contact between the shaft 51 and the guide bore 52, and the support 23. The actuator element 41 dissipates heat through the driven body 31 and the guide mechanism 5 in the manner described above.

Figure 3:
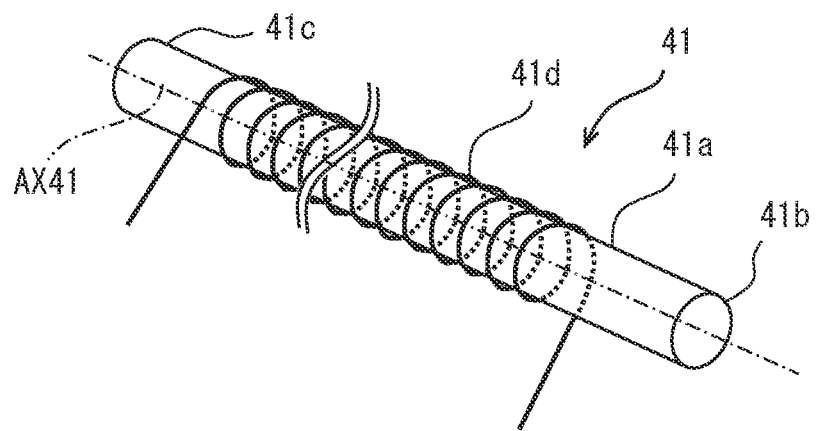
FIG. 3 is a perspective view of an actuator element.

In FIG. 3, the actuator element 41 includes a material line 41a, the securing end 41b, the output end 41c, and a heat generating line 41d. The material line 41a is the polymer fiber described above. The heat generating line 41d is also a part of the energy increasing/decreasing device 71. The heat generating line 41d is also an energy transfer element for increasing or decreasing the energy of the material line 41a. The heat generating line 41d is directly disposed on a surface of the material line 41a or indirectly disposed over the surface of the material line 41a. The heat generating line 41d has a spiral shape or coil shape. The heat generating line 41d is a metal line that generates heat when electricity passes therethrough. The heat generating line 41d can be a platinum wire, a copper wire, or the like. The heat generating line 41d is a nichrome wire. A round wire, a square wire, or metal foil can serve as the heat generating line 41d. The heat generating line 41d is joined to the surface of the material line 41a.

The heat generating line 41d generates heat when electricity passes therethrough. Heat supplied by the heat generating line 41d is transferred to the material line 41a, raising the temperature of the material line 41a. The heat generating line 41d stops generating heat when passage of electricity is interrupted. Heat of the material line 41a is dissipated to an outside environment. Here, the third coupling mechanism 31a and the guide mechanism 5 at the output end 41c contribute to the heat dissipation. Thus, a large temperature difference can be accomplished in the actuator element 41.

Figure 4:
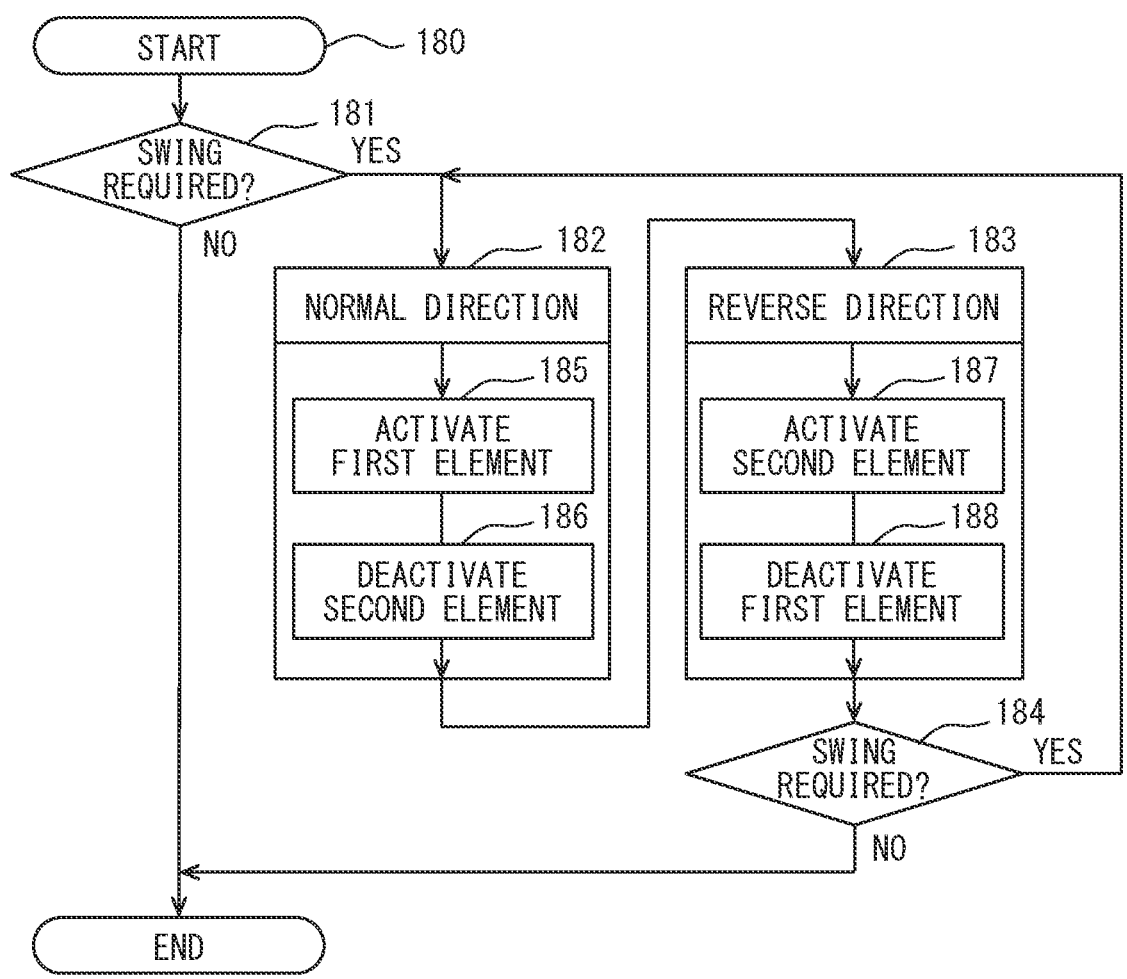
FIG. 4 is a flowchart for swinging the movable device.

In FIG. 4, a control process 180 for swinging the driven body 31 is illustrated. The control process 180 is a part of a control process of the controller 70.

It is determined in step 181 whether swing of the movable device 1 is required (ON) or not required (OFF). For example, when operation of a scanning-type infrared sensor is required, it is determined that swing is required (ON). When operation of the scanning-type infrared sensor is not required, it is determined that swing is not required (OFF). When it is determined that the swing is not required (OFF), the control is finished. When it is determined that swing is required (ON), the flowchart proceeds to a loop process including steps 182 and 183. Step 182 is a process for heating the first actuator element 41. Step 183 is a process for heating the second actuator element 42. By repeating steps 182 and 183 alternately, the driven body 31 is operated in a swinging manner. It is determined in step 184 whether swing of the movable device 1 is required (ON) or not required (OFF).

Step 182 is a process in which the driven body 31 is rotated in a normal direction. When rotated in the normal direction, the driven body 31 is rotated in a clockwise direction as viewed from the first actuator element 41. Step 182 includes steps 185 and 186.

In step 185, first, the first actuator element 41 is activated. Electricity passes through in step 185 the heat generating line 41d of the first actuator element 41. Specifically, the controller 70 causes electricity to pass from the energy increasing/decreasing device 71 to the heat generating line 41d. The processing of step 185 is performed to cause the first actuator element 41 to output torsion of a predefined angle in the normal direction. For example, step 185 is continued until a rotary angle of the driven body 31, as detected by a rotary angle sensor, reaches the predefined angle. Alternatively, the processing of step 185 may be continued for a certain time period by using a timer.

In step 186, the second actuator element 42 is deactivated. Passage of electricity through the heat generating line 41d of the second actuator element 42 is interrupted in step 186. Specifically, the controller 70 interrupts electricity passing from the energy increasing/decreasing device 72 to the heat generating line 42d. Wherein step 185 and 186 act concurrently as part of step 182.

Step 183 is a process in which the driven body 31 is rotated in a reverse direction. Step 183 includes steps 187 and 188.

In step 187, first, the second actuator element 42 is activated. Electricity passes through in step 187 a heat generating line of the second actuator element 42. Specifically, the controller 70 causes electricity to pass from the energy increasing/decreasing device 72 to the heat generating line.

The first actuator element 41 is deactivated in step 188. Passage of electricity through the heat generating line of the first actuator element 41 is interrupted in step 188. Specifically, the controller 70 interrupts electricity passing from the energy increasing/decreasing device 71 to the heat generating line. Wherein step 187 and 188 act concurrently as part of step 183.

In the present embodiment, activation corresponds to passage of electricity through the heat generating line 41*d*. Deactivation corresponds to interruption of passage of electricity through the heat generating line 41*d*. A pair of terms, activation and deactivation, can be associated with pairs of terms, i.e., heating and heat dissipation, energization and de-energization, and being active and being on standby.

The controller 70 controls the energy increasing/decreasing device 71 to repeat alternately a time period when the energy of the actuator element 41 increases and a time period when the energy of the actuator element 41 decreases. As a result, the two actuator elements 41 and 42 are actively moved alternately. When the first actuator element 41 actively outputs a torsional deformation in the normal direction, the second actuator element 42 is passively moved in the normal direction. Conversely, when the second actuator element 42 actively outputs a torsional deformation in the reverse direction, the first actuator element 41 is passively moved in the reverse direction. Since the two actuator elements 41 and 42 are used and moved alternately, the turning output can be obtained stably in both directions.

The embodiment described above can provide the movable device 1 that is quiet. Quietness is particularly advantageous when the movable device 1 is used in a device installed in a room. For example, a quiet scanning-type infrared sensor can be obtained. Since the movable device 1 includes the guide mechanism 5, vibration of the driven body 31 is inhibited. In particular, vibration in directions that intersect with the turning axis AXR, that is, vibration in up-and-down directions and right-and-left directions with respect to the turning axis AXR, is inhibited. The guide mechanism 5 determines the turning axis AXR, which is coaxial with the actuator axis AX41, thus enabling direct extraction of torsional deformation of the actuator element 41. Furthermore, the guide mechanism 5 contributes to dissipation of heat from the actuator element 41.

An embodiment is described below that is a modification of the foregoing basic embodiment. In the foregoing basic embodiment, the support 23 can be in direct contact with the driven body 31. In the present embodiment, sliders 253 and 254 are disposed between a support 23 and a driven body 31 instead of the above configuration.

Figure 5:
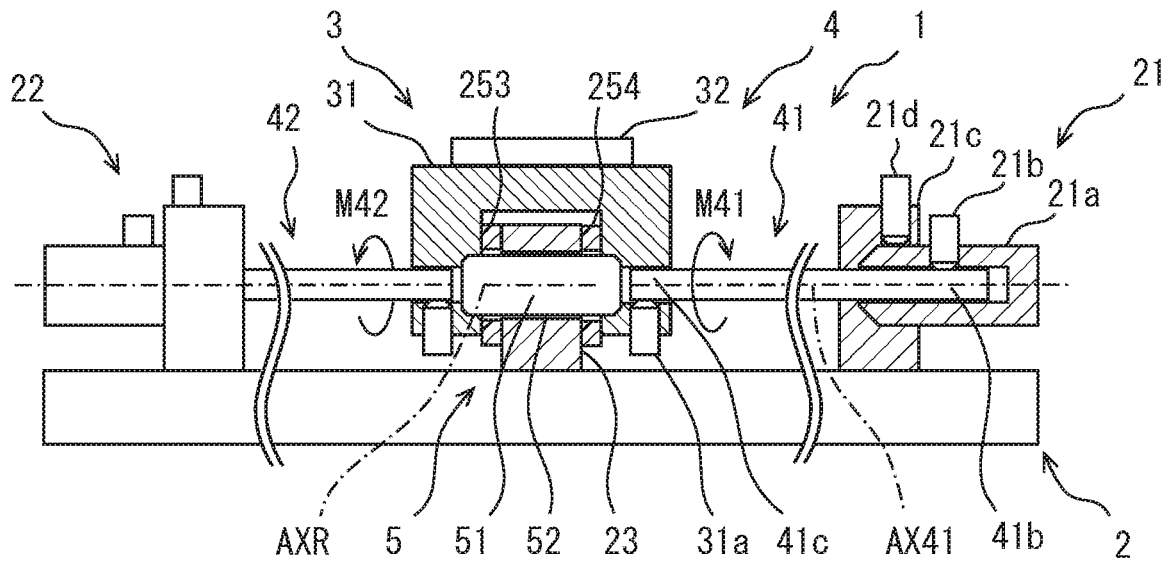
FIG. 5 is a partial sectional view of a movable device according to at least one embodiment.

As illustrated in FIG. 5, the sliders 253 and 254 are disposed between the support 23 and the driven body 31, which face with one another along the turning axis AXR. The sliders 253 and 254 are annular elements. The sliders 253 and 254 can be referred as washers. The sliders 253 and 254 are made using polytetrafluoroethylene. The sliders 253 and 254 inhibit sliding resistance in contact portions between the support 23 and the driven body 31. The sliders 253 and 254 allow the support 23 and the driven body 31 to have enlarged areas of contact. Thus, increased heat can be transferred from the driven body 31 to the support 23 via the sliders 253 and 254.

An embodiment is described below that is a modification of the foregoing basic embodiment. In the foregoing basic embodiment, the shaft 51 can be in direct contact with the guide bore 52. Additionally, the guide bore 52 is provided in the support 23. In the present embodiment, a guide bore 52 is provided in a sleeve 355 instead of the above configuration.

Figure 6:
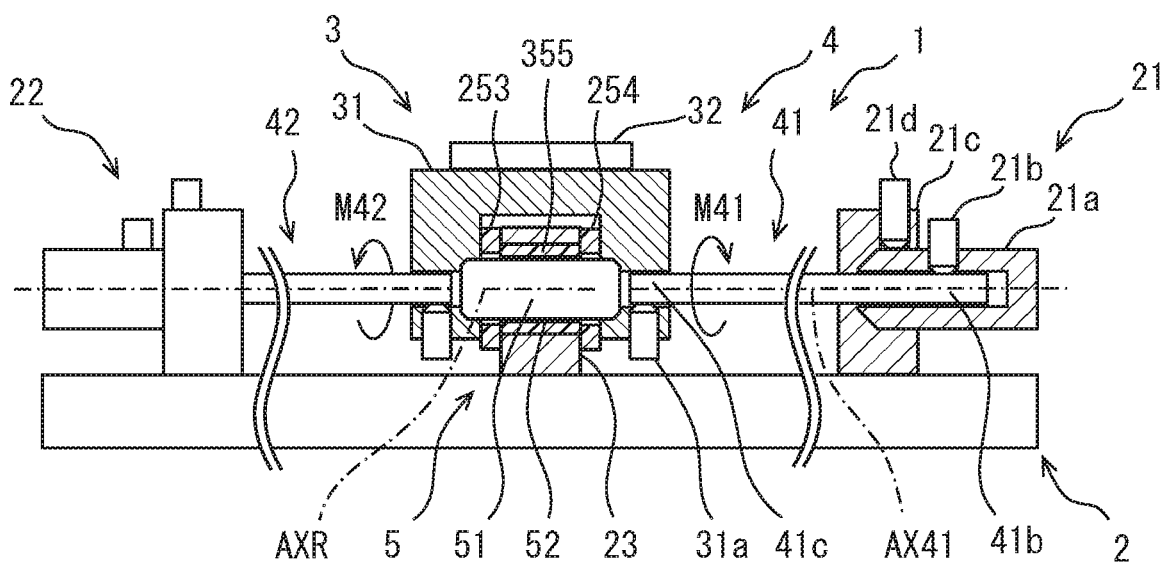
FIG. 6 is a partial sectional view of a movable device according to at least one embodiment.

As illustrated in FIG. 6, a support 23 includes the sleeve 355 which provides the guide bore 52. The sleeve 355 has a tubular shape. The sleeve 355 is made using polytetrafluoroethylene. The sleeve 355 inhibits sliding resistance in contact portions between a shaft 51 and the guide bore 52. The sleeve 355 allows the shaft 51 and the guide bore 52 to have enlarged areas of contact. Thus, increased heat can be transferred from the driven body 31 to the support 23 via the shaft 51 and the guide bore 52.

An embodiment is described below that is a modification of the foregoing basic embodiment. In the foregoing basic embodiment, the support 23 can be in direct contact with the driven body 31. In the present embodiment, gaps, or hollows, are provided between a support 23 and a driven body 31 instead of the above configuration.

Figure 7:
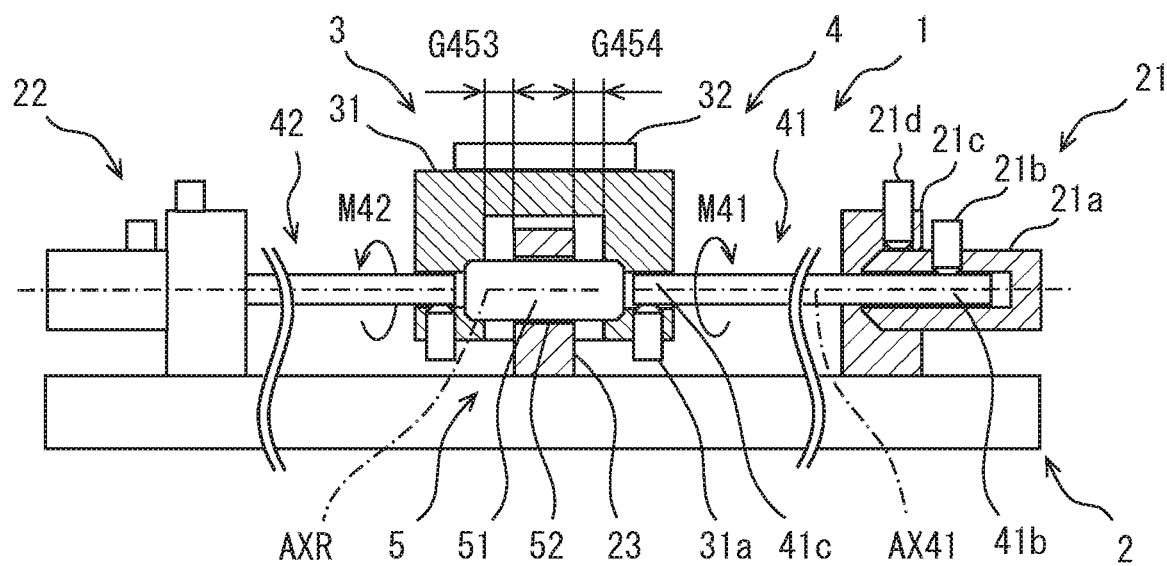
FIG. 7 is a partial sectional view of a movable device according to at least one embodiment.

As illustrated in FIG. 7, a gap G453 and a gap G454 are provided between the support 23 and the driven body 31 on both sides of the support 23. The gaps G453 and G454 represent gaps located in an axial direction of the turning axis AXR. The gaps G453 and G454 are also hollows. The gaps G453 and G454 inhibit direct contact between the support 23 and the driven body 31. Thus, sliding resistance between the support 23 and the driven body 31 is inhibited. Heat of an actuator element 41 is dissipated from the driven body 31 via a shaft 51 and a guide bore 52 to the support 23.

The actuator element 41 has a property of changing in length in an axial direction of the actuator axis AX41 in response to increase or decrease of energy. A typical example of a length fluctuation range Lt resulting from increase or decrease of energy is expansion or contraction of the actuator element 41 resulting from increase or decrease of temperature. The actuator element 41 has a predefined length fluctuation range Lt in an assumed operating temperature range. For example, the actuator element 41 has a predefined length fluctuation range Lt in an assumed range of −20° C. to +60° C. The lengths of the gaps G453 and G454 in the axial direction of the actuator axis AX41 are greater than the predefined length fluctuation range Lt. In other words, the length of the gap G453 or the gap G454 corresponds to a range of the relative motion of the shaft 51 and the guide bore 52 which are relatively movable to each other. Additionally, G453>Lt, and G454>Lt are established. Thus, direct contact between the driven body 31 and the support 23 is inhibited even when the actuator element 41 contracts.

An embodiment is described below that is a modification of the foregoing basic embodiment. In the foregoing basic embodiment, the driven body 31 and the shaft 51 are secured together, and the guide bore 52 is provided in the support 23. In the present embodiment, a support 523 and a shaft 551 are secured together, and a guide bore 552 is provided in a driven body 531 instead of the above configuration. The structure in the present embodiment can be combined with those of other embodiments.

Figure 8:
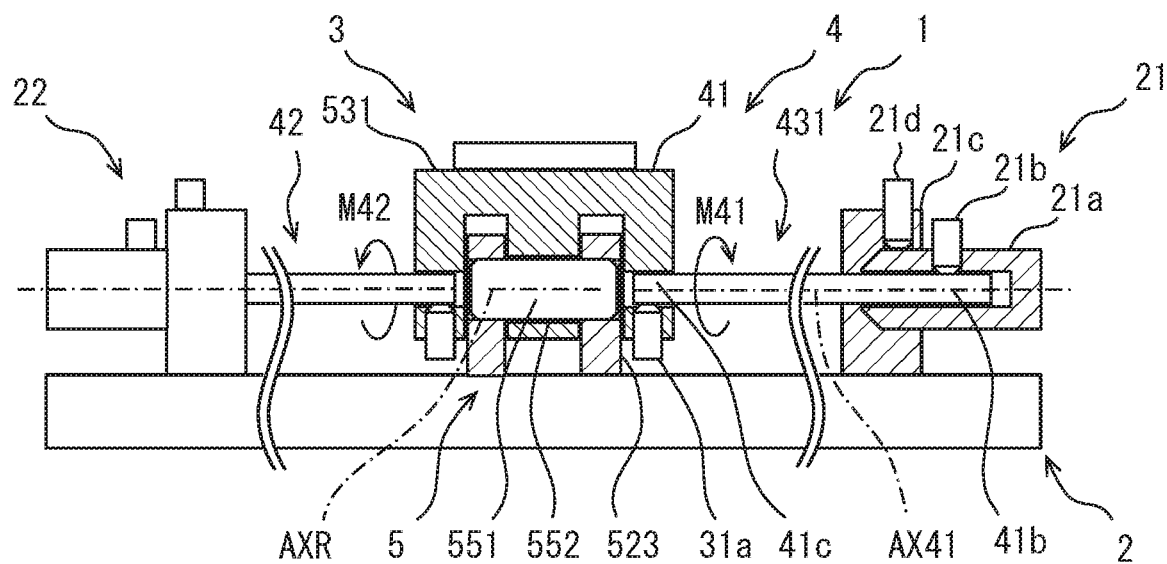
FIG. 8 is a partial sectional view of a movable device according to at least one embodiment.

As illustrated in FIG. 8, the support 523 and the shaft 551 are secured together, and the guide bore 552 is provided in the driven body 531. The support 523 includes two blocks. The support 523 is configured to support the shaft 551. The shaft 551 is secured at both end portions to the support 23. The support 523 includes the shaft 551. The driven body 531 has an E-shaped section. The driven body 531 includes the guide bore 552. A guide mechanism 5 is provided also in the present embodiment. The present embodiment uses the support 523 including the two blocks and the driven body 531 having the E-shaped section. An enlarged area is thus obtained for heat dissipation on a surface of the driven body 531. Additionally, a surface of the driven body 531 and a surface of the support 523 that face one another and thereby transfer heat can be increased.

An embodiment is described below that is a modification of the foregoing basic embodiment. In the foregoing basic embodiment, the two actuator elements 41 and 42 are used. Alternatively, one actuator element 41 may be provided. In such cases, a passive turning mechanism can be used in place of the second actuator element 42. Various mechanisms, such as rubber, a resin spring, a metal spring, and an air spring, can serve as the passive turning mechanism. The passive turning mechanism is referred to as a return mechanism.

Figure 9:
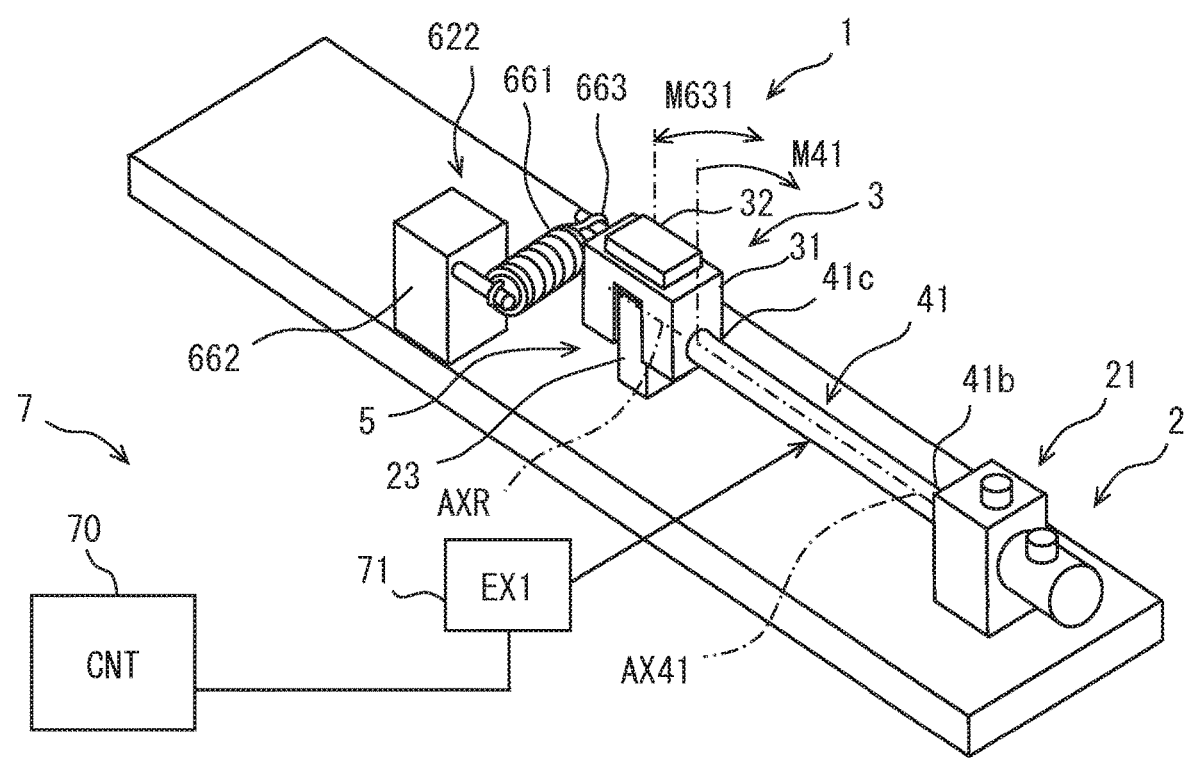
FIG. 9 is a perspective view of a movable device according to at least one embodiment.

In FIG. 9, a movable device 1 includes a return mechanism 622 in place of the second actuator element 42. The return mechanism 622 includes an elastic component 661 that is passive, a securing portion 662, and a securing portion 663. The securing portion 662 is a block secured to a base 2. The securing portion 663 is secured to a driven body 31.

The elastic component 661 is a coil spring made using metal. When pulled out of its free state, the elastic component 661 causes a force in a counterclockwise direction to act on the driven body 31. The elastic component 661 has a reference position at an end of a turning range M631 of the driven body 31. The elastic component 661 is placed so as to be pulled due to torsional motion of the actuator element 41. The elastic component 661 causes a return force to act against the turning force that is in a direction of the arrow M41. As a result, the actuator element 41 is moved intermittently, in other words, it repeats an activated state and a deactivated state periodically, thereby causing the driven body 31 to turn within the turning range M631.

According to the present embodiment, the single actuator element 41 can provide reciprocating motion of the driven body 31. Additionally, the driven body 31 is stabilized because a guide mechanism 5 is provided. The configuration of the present embodiment can be used in other foregoing embodiments.

The disclosure presented herein is not limited to the embodiments provided as examples. The disclosure includes the embodiments provided herein as examples and modifications based on the embodiments provided herein made by persons skilled in the art. For example, the disclosure is not limited to components and/or combinations of elements presented in the embodiments provided herein. The disclosure can be implemented in various combinations. The disclosure can include additional portions that can be added to the embodiments provided herein. The disclosure includes any of the embodiments provided herein with a component and/or element thereof omitted. The disclosure includes replacement or combination of a component and/or element of one of the embodiments provided herein with that of another one of the embodiments provided herein. The technical scope disclosed herein is not limited to the description of the embodiments.

In the foregoing embodiments, the guide mechanism 5 includes the shaft 51 or 551 and the guide bore 52 or 552. The shaft 51 or 551 and the guide bore 52 or 552 serve as what is called a bearing mechanism. The bearing mechanism that serves as the guide mechanism 5 can be many different mechanisms such as a ball bearing, fluid bearing, and magnetic bearing, in addition to the sliding bearing as in the embodiments provided herein. In the embodiments provided herein, a sliding bearing that is relatively simple and lightweight is employed in consideration of the upper limit of the rotation torque that the actuator elements 41 and 42 can output.

In the foregoing embodiments, the shaft 51 or 551, which is a separate element, is secured to the driven body 31 or the support 523. Alternatively, a shaft may be integral with the driven body 31 or the support 523. For example, a cylindrical portion, in place of the shaft 51, can be formed in the driven body 31 or the support 523 by using machining. Alternatively, a cylindrical portion, in place of the shaft 51, can be formed in the driven body 31 or the support 523 by using insert molding.

The securing portion can include a mechanism that mechanically limits the rotational direction as a feature additional to the foregoing embodiments. For example, the securing portion can include a ratchet mechanism. For example, the ratchet mechanism secures the securing end 41*b* when the securing end 41*b* rotates in the direction of the arrow M42. Conversely, the ratchet mechanism releases the securing end 41*b* when the securing end 41*b* rotates in the direction of the arrow M41. The ratchet mechanism achieves a secured state to allow an active deformation and a released state to cancel a passive deformation.

Securing force at the securing end 41*b* or the output end 41*c* may be rendered variable as a feature additional to the foregoing embodiments. In such cases, the securing portions may be capable of electrically control respective variable securing force. Securing force of the securing portions 21 and 22 may be changed between a released state and a secured state or between a strong level and a weak level. For example, the coupling mechanism 21*d* may be switched between a state in which the coupling mechanism 21*d* is firmly tightened to an outer circumferential surface of the end sleeve 21*a* and a state in which the coupling mechanism 21*d* lightly presses on the outer circumferential surface of the end sleeve 21*a*. In such cases, the end sleeve 21*a* turns, rubbing against the set screw.

In the foregoing embodiments, the heat generating line 41*d* is wound around the material line 41*a* directly. Alternatively, an element may be placed between the material line 41*a* and the heat generating line 41*d*. For example, a supporter that is electrically insulating and having excellent thermal conductivity can be placed therebetween. The supporter can be insulating paper wrapped around the material line 41*a* or a glass tube accommodating the material line 41*a* therein. As described above, in one aspect, the heat generating line 41*d* is in direct contact with the material line 41*a*, while in another aspect, the heat generating line 41*d* is wound around the material line 41*a* without contacting the material line 41*a* directly. A heat generator may be disposed on an inner surface of the supporter.

In the foregoing embodiments, the energy of the material line 41*a* is increased or decreased by heating or heat dissipation of the heat generating line 41*d*. Alternatively, the energy of the material line 41*a* can be increased or decreased by cooling or dissipation by a cooling device. For example, a Peltier effect element can be disposed along the material line 41*a*. The Peltier effect element serves as the energy transfer element. In such cases, when cooled, the material line 41*a* undergoes thermal expansion or thermal contraction to produce torsional deformation.

In the foregoing embodiments, a nichrome wire is used as the heat generating line 41*d*. Alternatively, various electrical heat generators can serve as the energy transfer element. For example, a conductive film referred to as a conductive polymer or a conductive metal coating may serve as the heat generator. In such cases, the film is formed on a surface of the material line 41*a*. For example, a conductive polymer or a conductive metal coating is formed on the surface of the material line 41*a* by using various methods such as plating, synthesis, and sputtering. The film has a spiral shape that is wound around the material line 41*a*. Alternatively, a heat generator having a spiral shape may be formed, by winding a conductive polymer or conductive metal coating having a ribbon shape and made separately from the material line 41*a* around the material line 41*a*, and disposed outside the material line 41*a*.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A movable device comprising:
   an actuator element configured to deform about an actuator axis in response to increase or decrease in energy of the actuator element;
   a driven body coupled to the actuator element on the actuator axis and turned by deformation of the actuator element;
   a support supporting the driven body such that the driven body is rotatable;
   a shaft fixed to one of the support or the driven body;
   a guide mechanism configured to guide turning of the driven body about a turning axis coaxial with the actuator axis such that torsional deformation of the actuator element is directly transferred to the turning of the driven body;
   an energy increasing-decreasing device that increases or decreases energy of the actuator element; and
   a controller configured to control the energy increasing-decreasing device to repeat alternately a time period when the energy of the actuator element increases and a time period when the energy of the actuator element decreases, wherein
   the actuator element includes a first actuator element and a second actuator element which are disposed symmetrically with respect to the driven body,
   the first actuator element and the second actuator element rotate in opposite directions when actuated, and
   the controller repeats alternately a time period during which an energy of the first actuator element increases while an energy of the second actuator element decreases and a time period during which the energy of the first actuator element decreases while the energy of the second actuator element increases, wherein the guide mechanism includes the shaft and a guide bore around the shaft, and the driven body is guided about the shaft, and wherein the shaft and the guide bore are movable relative to each other in an axial direction, the actuator element has a length fluctuation range in which a length of the actuator element in a direction of the actuator axis changes in response to increase or decrease in energy of the actuator element, and a range of the relative motion of the shaft and the guide bore is greater than the length fluctuation range of the actuator element.

2. The movable device according to claim 1, further comprising:
   a base that is stationary, wherein
   the support is secured to the base,
   the driven body includes the shaft, and
   the support includes the guide bore.

3. The movable device according to claim 1, further comprising:
   a base that is stationary, wherein
   the support is secured to the base,
   the driven body includes the guide bore, and
   the support includes the shaft.

4. The movable device according to claim 1, wherein a member forming at least one of the shaft and the guide bore is made of a material having a low friction property.

5. The movable device according to claim 1, wherein the actuator element deforms about the actuator axis in response to increase or decrease in thermal energy of the actuator element.

6. The movable device according to claim 5, wherein the actuator element releases heat through the driven body and the guide mechanism.

7. The movable device according to claim 1, wherein the actuator element includes synthetic fiber.

8. A movable device comprising:
   a rotary actuator configured to torsionally deform about an actuator axis in response to increase or decrease in energy of the rotary actuator;
   a driven body fixed to the rotary actuator and rotated by the torsional deformation of the rotary actuator about the actuator axis;
   a support supporting the driven body such that the driven body is rotatable;
   a shaft fixed to one of the driven body and the support and coaxial with the actuator axis; and
   a guide bore provided in the other of the driven body and the support through which the shaft extends such that the shaft is slidable in the guide bore;
   an energy increasing-decreasing device that increases or decreases the energy of the actuator element; and
   a controller configured to control the energy increasing-decreasing device to repeat alternately a time period when the energy of the actuator element increases and a time period when the energy of the actuator element decreases, wherein
   the actuator element includes a first actuator element and a second actuator element which are disposed symmetrically with respect to the driven body,
   the first actuator element and the second actuator element rotate in opposite directions when actuated, and
   the controller repeats alternately a time period during which an energy of the first actuator element increases while an energy of the second actuator element decreases and a time period during which the energy of the first actuator element decreases while the energy of the second actuator element increases, wherein the guide mechanism includes the shaft and the guide bore around the shaft, and the driven body is guided about the shaft, and wherein the shaft and the guide bore are movable relative to each other in an axial direction, the actuator element has a length fluctuation range in which a length of the actuator element in a direction of the actuator axis changes in response to increase or decrease in energy of the actuator element, and a range of the relative motion of the shaft and the guide bore is greater than the length fluctuation range of the actuator element.

* * * * *